(12) United States Patent
Wright

(10) Patent No.: US 7,912,825 B2
(45) Date of Patent: Mar. 22, 2011

(54) CONFIGURABLE PLUG-IN ARCHITECTURE FOR MANIPULATING XML-FORMATTED INFORMATION

(75) Inventor: David C Wright, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 334 days.

(21) Appl. No.: 11/957,390

(22) Filed: Dec. 14, 2007

(65) Prior Publication Data

US 2008/0320028 A1    Dec. 25, 2008

Related U.S. Application Data

(60) Provisional application No. 60/945,552, filed on Jun. 21, 2007.

(51) Int. Cl.
*G06F 7/00* (2006.01)
(52) U.S. Cl. .................................................. 707/705
(58) Field of Classification Search ................ 707/705, 707/706–781, 821–831
See application file for complete search history.

(56) References Cited

U.S. PATENT DOCUMENTS

| | | | |
|---|---|---|---|
| 7,200,816 B2 | 4/2007 | Falk et al. | |
| 2005/0086635 A1* | 4/2005 | Parikh et al. | 717/103 |
| 2005/0132284 A1 | 6/2005 | Lloyd et al. | |
| 2005/0144257 A1 | 6/2005 | Bayardo et al. | |
| 2005/0149395 A1* | 7/2005 | Henkin et al. | 705/14 |
| 2005/0187973 A1 | 8/2005 | Brychell et al. | |
| 2006/0069803 A1 | 3/2006 | Clark et al. | |
| 2006/0218488 A1 | 9/2006 | Shah et al. | |
| 2006/0236224 A1 | 10/2006 | Kuznetsov et al. | |
| 2007/0061345 A1 | 3/2007 | Thompson et al. | |

OTHER PUBLICATIONS

Gazis, et al., "Metadata Design for Introspection-Capable Reconfigurable Systems",vol. 3042, IFIP International Federation for Information Processing, 2004, pp. 1318-1325.
Riva, et al., "Generation of Architectural Documentation using XML", Proceedings of the 9th Working Conference on Reverse Engineering (WCRE 2002), IEEE Computer Society Press, Oct. 29-Nov. 1, 2002, pp. 9.
Nesbitt, "XML-based documentation using AurigaDoc", SourceForge, Inc., 2007, pp. 1-5.

* cited by examiner

*Primary Examiner* — Don Wong
*Assistant Examiner* — Belinda Xue
(74) *Attorney, Agent, or Firm* — L. Alan Collins; Collins & Collins Incorporated

(57) ABSTRACT

A method and system is described for building a document using a configurable plug-in architecture. In one example, a configuration file containing information of building the document with one or more components is received. The one or more components execute to modify or manipulate the document. The document may further be passed from one component to another component, where each of the components performs a function on the document. The sequence of execution of the components, the type of function or activity executed by each of the components, and/or configuration data of the components may be provided by the configuration file. The document may further be output to a user or stored.

19 Claims, 6 Drawing Sheets

```xml
<components>
<component assembly="Components.dll" type="Copy">
    <data file="apis.xml" />
    <copy source="/apis/api[@id=$id]" target="/" />
</component>
<component assembly="Components.dll" type="Copy">
    <data file="comments.xml" />
    <copy source="/topics/topic[@id=$id]"
        target="/api/comments" />
</component>
<component assembly="Components.dll" type="Transform">
    <transform file="transform.xsl" />
</component>
<component assembly="Components.dll" type="Save">
    <save file="concat('Output/',$id,'.htm')" />
</component>
</components>
```

FIG. 4

```
public abstract class BuildComponent { protected BuildComponent (XPathNavigator configuration);

public abstract Apply (XmlDocument document, string id);

CONFIGURABLE PLUG-IN ARCHITECTURE FOR MANIPULATING XML-FORMATTED INFORMATION

CROSS-REFERENCE TO RELATED APPLICATION

This application claims the benefit of U.S. Provisional Patent Application Ser. No. 60/945,552, filed Jun. 21, 2007, entitled "CONFIGURABLE PLUG-IN ARCHITECTURE FOR MANIPULATING XML-FORMATTED INFORMATION" which is incorporated herein by reference in its entirety.

BACKGROUND

The creation and management of documents in any of a number of formats has become commonplace. These documents may range from free-form to highly structured data structures, schemas, etc. Also the documents may be generated based on information from different sources or input files.

However, typically document build systems lack the capacity to efficiently provide arbitrary output formats or to draw on multiple input files. Previous document build systems consist of a single monolithic application that generates a fixed sort of documentation from a fixed set of inputs. Such build systems do not allow the entire build logic to be changed in arbitrary ways. These systems and methods also lack versatility to effectively create documents of any type under variable scenarios. Thus, there is a need for a system or method with flexibility to manage different document scenarios as well as remain sufficiently unified to present a uniform interface for a user.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one example, a method for generating a document is described in which a component or group of components are used to modify a document based on a configuration file. For example, a first component and a second component may execute a function or action on a document in a sequence based on the configuration file.

In another example, the order or sequence of execution of the components may be modified. For example, the configuration file may be modified which may cause a corresponding change in the order of execution of the components in the generation of the document.

In yet another example, a plurality of components for modifying or manipulating a document is assembled based on a configuration file. Each of the components may execute a function or action on the document in a sequence indicated by the configuration file.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 4 illustrates an example of a configuration file.

FIG. 5 illustrates an example of a pseudo-header.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples. Systems described herein are provided as examples and not limitations. As those skilled in the art will appreciate, the present examples are suitable for application in a variety of different types of computing systems.

Figure 1:
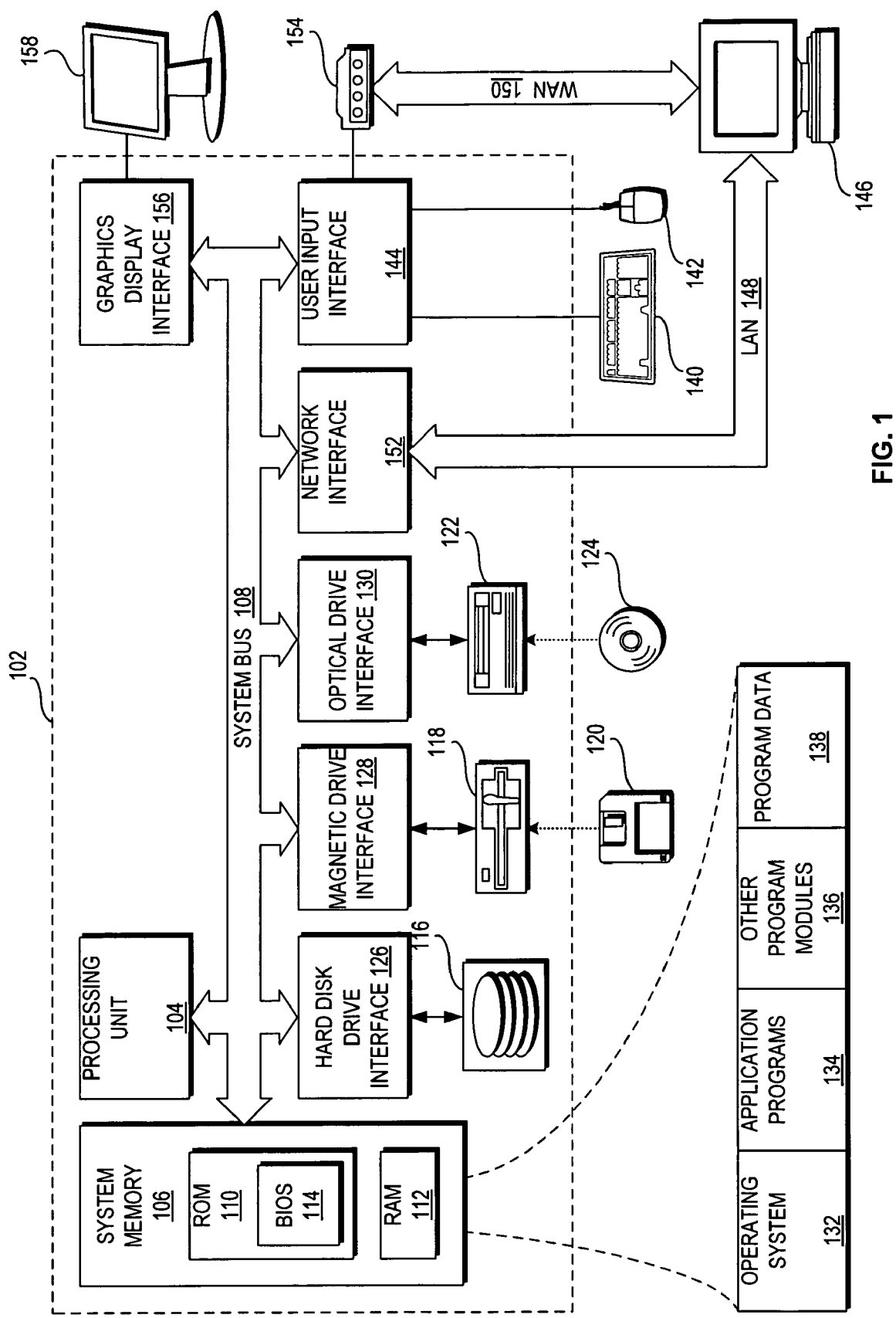
FIG. 1 illustrates an example of a suitable computing system environment.

FIG. 1 illustrates an example of a suitable computing system environment or architecture in which computing subsystems may provide processing functionality. The computing system environment is only one example of a suitable computing environment and is not intended to suggest any limitation as to the scope of use or functionality of the invention. Neither should the computing environment be interpreted as having any dependency or requirement relating to any one or combination of components illustrated in the exemplary operating environment.

The method or system disclosed herein is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The method or system may be described in the general context of computer-executable instructions, such as program modules, being executed by a computer. Generally, program modules include routines, programs, objects, components, data structures, etc. that perform particular tasks or implement particular abstract data types. The method or system may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the method or system includes a general purpose computing device in the form of a computer 102. Components of computer 102 may include, but are not limited to, a processing unit 104, a system memory 106, and a system bus 108 that couples various system components including the system memory to the processing unit 104. The system bus 108 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 102 typically includes a variety of computer readable media. Computer readable media can be any available media that can be accessed by computer 102 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 102. Combinations of the any of the above should also be included within the scope of computer readable storage media.

The system memory 106 includes computer storage media in the form of volatile and/or nonvolatile memory such as read only memory (ROM) 110 and random access memory (RAM) 112. A basic input/output system 114 (BIOS), containing the basic routines that help to transfer information between elements within computer 102, such as during start-up, is typically stored in ROM 110. RAM 112 typically contains data and/or program modules that are immediately accessible to and/or presently being operated on by processing unit 104. By way of example, and not limitation, FIG. 1 illustrates operating system 132, application programs 134, other program modules 136, and program data 138.

The computer 102 may also include other removable/non-removable, volatile/nonvolatile computer storage media. By way of example only, FIG. 1 illustrates a hard disk drive 116 that reads from or writes to non-removable, nonvolatile magnetic media, a magnetic disk drive 118 that reads from or writes to a removable, nonvolatile magnetic disk 120, and an optical disk drive 122 that reads from or writes to a removable, nonvolatile optical disk 124 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 116 is typically connected to the system bus 108 through a non-removable memory interface such as interface 126, and magnetic disk drive 118 and optical disk drive 122 are typically connected to the system bus 108 by a removable memory interface, such as interface 128 or 130.

The drives and their associated computer storage media discussed above and illustrated in FIG. 1, provide storage of computer readable instructions, data structures, program modules and other data for the computer 102. In FIG. 1, for example, hard disk drive 116 is illustrated as storing operating system 132, application programs 134, other program modules 136, and program data 138. Note that these components can either be the same as or different from additional operating systems, application programs, other program modules, and program data, for example, different copies of any of the elements. A user may enter commands and information into the computer 102 through input devices such as a keyboard 140 and pointing device 142, commonly referred to as a mouse, trackball or touch pad. Other input devices (not shown) may include a microphone, joystick, game pad, pen, scanner, or the like. These and other input devices are often connected to the processing unit 104 through a user input interface 144 that is coupled to the system bus, but may be connected by other interface and bus structures, such as a parallel port, game port or a universal serial bus (USB). A monitor 158 or other type of display device is also connected to the system bus 108 via an interface, such as a video interface or graphics display interface 156. In addition to the monitor 158, computers may also include other peripheral output devices such as speakers (not shown) and printer (not shown), which may be connected through an output peripheral interface (not shown).

The computer 102 may operate in a networked environment using logical connections to one or more remote computers, such as a remote computer. The remote computer may be a personal computer, a server, a router, a network PC, a peer device or other common network node, and typically includes many or all of the elements described above relative to the computer 102. The logical connections depicted in FIG. 1 include a local area network (LAN) 148 and a wide area network (WAN) 150, but may also include other networks. Such networking environments are commonplace in offices, enterprise-wide computer networks, intranets and the Internet.

When used in a LAN networking environment, the computer 102 is connected to the LAN 148 through a network interface or adapter 152. When used in a WAN networking environment, the computer 102 typically includes a modem 154 or other means for establishing communications over the WAN 150, such as the Internet. The modem 154, which may be internal or external, may be connected to the system bus 108 via the user input interface 144, or other appropriate mechanism. In a networked environment, program modules depicted relative to the computer 102, or portions thereof, may be stored in the remote memory storage device. By way of example, and not limitation, remote application programs may reside on a memory device. It will be appreciated that the network connections shown are exemplary and other means of establishing a communications link between the computers may be used.

In one example, a build engine may create documents of any type or number. For example, documents may include any free-form topic created by an author, a structured API, a schema, a protocol reference, etc. The following description is applicable to any form of document building. In addition, an output document may include information based on any number or type of sources. For example, an output document may include information derived from any number of multiple input files, authored source files, code sample files, or files containing API, schema or protocol metadata, to name a few.

In this example, a build engine or other system is described that may receive any number or type of output files to generate. For example, the build engine may receive a configuration file that may describe steps to be executed to produce a desired output document or any other such pertinent information for the build engine. The configuration file may also contain information for specifying components to be loaded or utilized in a document build, specifying the order in which components operate, and/or providing configuration data for any of the components.

The build engine in this example may execute any number of steps for building a document. The steps may be executed in an order or sequence as indicated by corresponding configuration data in a configuration file. Also, each of the steps executed for building the document may be executed by any number or type of components in the build engine that may act in an arbitrary fashion on the document. For example, a first component in the build engine may receive a document and, based on information in the configuration file, may perform a desired function or action on the document to manipulate or modify the document. The first component may pass the modified document to a second component, which may also be indicated by at least a portion of the configuration data. The second component may receive the modified document from the first component and may perform an action or function on the received modified document. The action or function performed by the second component on the received modified document may, for example, be determined by at least a portion of data in the configuration file. The process may be repeated such that the document may be modified or manipulated by any number of components in a sequence to produce an output document.

In another example, the sequence of execution of the components in the build engine may be modified. Also, the functions or actions executed by any of the components may be modified such that a single component may perform any number and type of different functions or actions on a document. In this example, configuration data or settings of a component may be modified such that the component may perform a different function or action. In this case, a first component may modify a document based on configuration data and may further perform a different modification to the document based on different configuration data. Thus, in this example, the action of any individual component may be changed and any individual component may be reused with different configuration settings to perform a different function.

In another example, output files may be created and may be changed without requiring that the system be re-compiled. Also, any of the steps in the creation of the output file may be configured without re-compiling either the system or the step logic. In addition, a uniform framework may be used to control any of the variable aspects.

Figure 2:
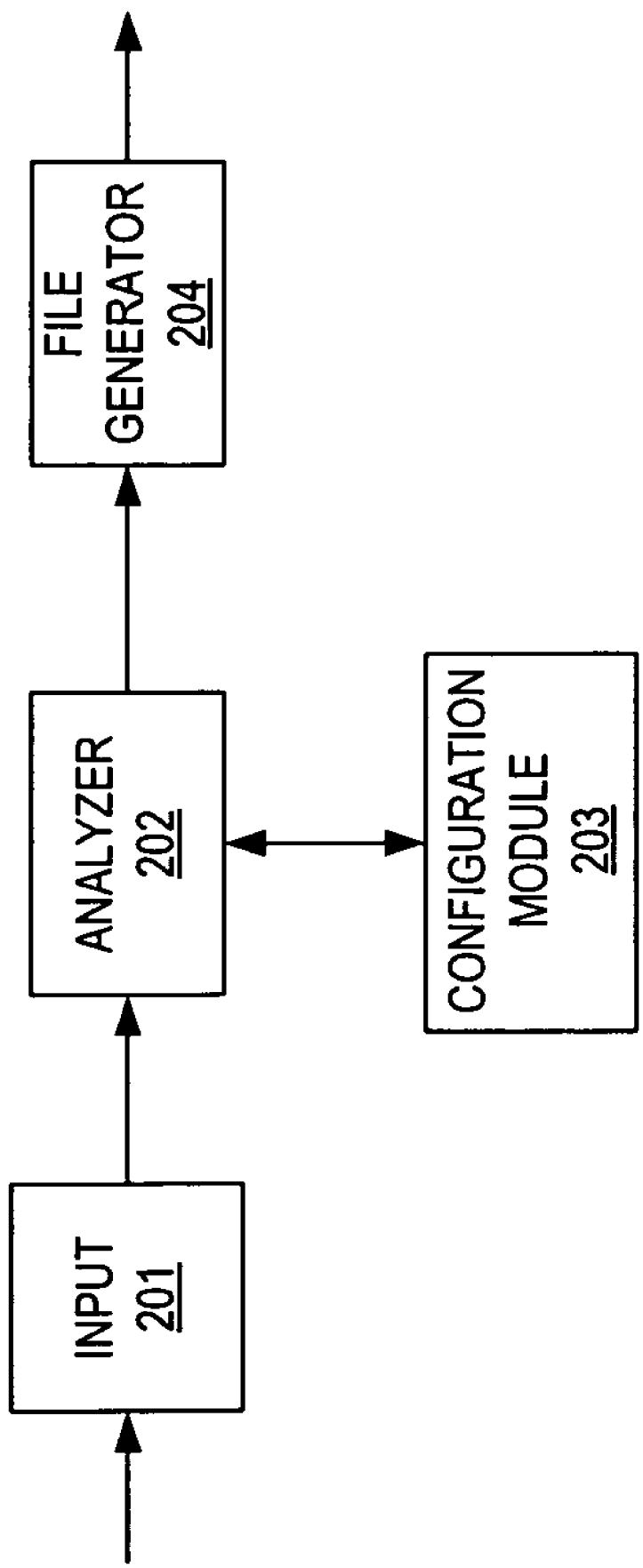
FIG. 2 is a block diagram illustrating one example of a system or build engine for creating output documents.

An engine may accept an arbitrary list of output files for generation. FIG. 2 is a block diagram illustrating one example of a system or build engine for creating output documents. In this example, the system includes an input 201 for receiving an arbitrary list of output files to generate. The arbitrary list of output files are analyzed in the analyzer 202 in which a configuration file may be read from a configuration module 203. Hence, in this example, the analyzer 202 receives a configuration file from the configuration module 203. The configuration file (not shown) may include information pertaining to output files. For example, the configuration file may include data corresponding to a sequence of steps to be performed for each output file. The steps may be executed, for example, by a file generator 204 that may produce a desired output document. In this example, the file generator 204 may include any number of component processors (not shown) that may receive a document from a previous component processor and execute an add-in component that may act in an arbitrary fashion on the received document. The component processor of the file generator 204 may further pass the document to a next component processor for further processing.

Any of the add-in components may be modified such that the steps for constructing a given document may be varied in any number of ways. For example, the order of components in a configuration file may be changed. In this example, a component may read configuration data in a configuration file. The configuration data that is read may further determine an action by the component.

Figure 3:
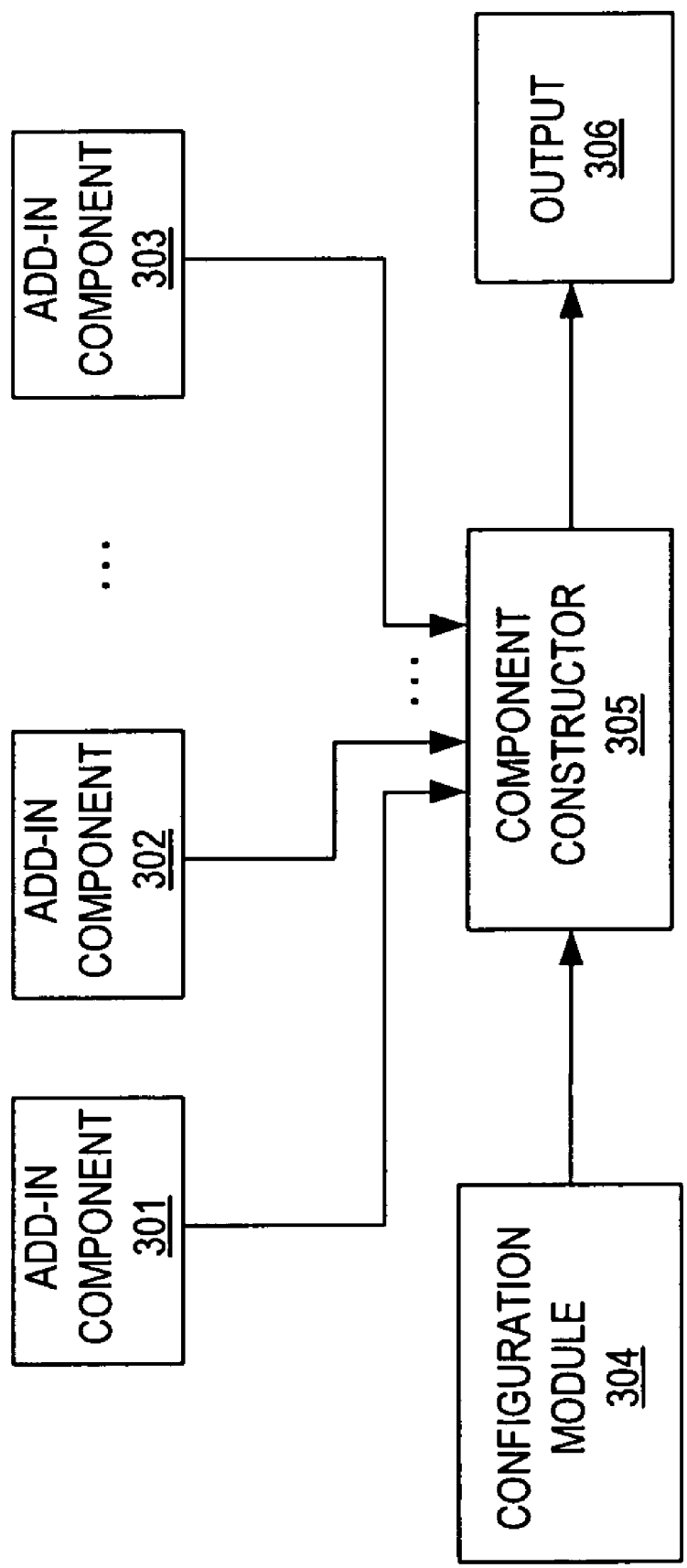
FIG. 3 is a block diagram illustrating another example of a system or build engine for a documentation build.

FIG. 3 is a block diagram illustrating another example of a system or build engine for a documentation build. In this example, information from a configuration module 304 may be used to build a document in a component constructor 305. For example, a configuration file may specify components to be loaded or the order in which the components operate, and/or configuration data for any component, to name a few.

Although FIG. 3 illustrates three add-in components (301-303), any number of add-in components (e.g., Add-in component 301, 302, and/or 303) may provide objects representing respective component elements.

In this example, the configuration module 304 provides a configuration file for determining an order of add-in components and the action or function of the add-in components. Also, the configuration file may contain configuration data pertaining to each of the add-in components. The component constructor 305 may receive an object from an add-in component (e.g., add-in component 301) based on data in the configuration file. For example, the configuration file may indicate that add-in component 301 is the first component for performing a desired action or function on a document. Also, the configuration file may provide configuration settings for add-in component 301 for performing the desired action or function.

The component constructor 305 in this example may receive an object from add-in component 301 which may include, for example, a component element. The component constructor 305 may use the object received from the add-in component 301 to read configuration data from the configuration module 304. In addition, a document may be created in the component constructor 305 corresponding to an output document. For example, the document may include an editable document (e.g., XML document) and/or a string for indicating a topic being built. An add-in component (e.g., add-in component 301) may be added as a component element by the component constructor. The add-in component (e.g., add-in component 301) may include a module for manipulating or managing a document based on configuration data and may further pass the manipulated document to another component or add-in component. The other component may receive the manipulated document from the first component and may further manipulate or manage the document to create an output document or may pass the document to yet another component or component element.

In this example, based on the configuration file from the configuration module 304, add-in components may pass corresponding objects and component elements to the component constructor 305. The configuration file may further determine the sequence of execution of the add-in components. Hence, based on this information in the configuration file, each of the add-in components may perform a corresponding function or action on a document. Each of the actions or functions associated with the add-in component may be executed in a sequence that may be indicated by at least a portion of the configuration file. In one example to illustrate, the configuration file may indicate that the add-in components execute respective functions or actions on a document such that add-in component 301 performs an action first, add-in component 302 performs an action second and add-in component 303 performs an action third. The configuration file may further provide configuration settings for each of the add-in components to perform the respective functions or actions. Based on the configuration file, add-in component 301 may perform its action on a document first and may subsequently pass the document to the second add-in component 302. Add-in component 302 may perform its action/function on the document received from the first add-in component 301 and subsequently pass the document to the third add-in component 303. The third add-in component 303 may receive the document from the second add-in component 302 and may further perform an action or function on the document. After each of the components performs a desired function or activity on the document, the document may be sent to an output 306 and may be output to a user. Alternatively or additionally, the document may be stored in memory or a storage device.

In another example, any of the add-in components may be re-configured or removed. For example, the configuration file from the configuration module 304 may be modified to indicate a different sequence of actions to be performed on a document. As one example to illustrate, the configuration file may contain data that indicates add-in component 302 to perform a function or action on the document first followed by add-in component 301. In this case, add-in component 302 performs a function on the document prior to add-in component 301. Add-in component 302 may, for example, send an object representing an associated component element to the component constructor 305. The component constructor 305 receives the object from add-in component 302 and may further execute an action or function on the received object based on the add-in component 302 and information from the configuration file. For example, the configuration file may include data indicating that add-in component 302 executes a particular step in a document build. Based on the data in the configuration file, the add-in component 302 may send an associated object to the component constructor 305 to execute an action or function on the document and pass the document to a next component, if desired.

In this example, add-in component 302 may modify the document based on execution of the component. Add-in component 302 may further pass the modified document to add-in component 301 in the system for further processing. Any of the steps executed by any of the components may be based on information in the configuration file. The order of execution of the components may also be modified by modifying the configuration file. For example, data in the configuration file may be modified to indicate that add-in component 301 executes prior to add-in component 302. In that case, the execution of the components may be modified accordingly.

Further, the functions or activities of any of the components may be changed via the configuration file. For example, the configuration file may indicate that add-in component 301 perform a first execution on the document followed by an execution of a function by add-in component 302. The configuration file may further indicate that add-in component 301 performs a second execution on the document following the execution or modification of the document by add-in component 302. The second execution of add-in component 301 may be different from the first execution of the add-in component 302. For example, the second execution of add-in component 301 may perform a different function or a different activity as that of the first execution of add-in component 301. In this case, the functionality of a component may be changed to perform different functions as needed.

FIG. 4 illustrates an example of a configuration file. In this example, the configuration file includes an XML file that specifies components to be loaded, the order in which they operate and the configuration data for each. Any of the component elements may cause an add-on component of the specified type to be instantiated from a specified assembly. In addition, the configuration data for the component may be represented as child nodes of the component element.

In one example to illustrate, a component may include a .NET managed type that implements an abstract class. For example, the build engine may include a console application. The console application may further define the abstract class implemented by each component. In addition, a pseudo-header may be used. FIG. 5 illustrates an example of a pseudo-header that includes aspects of the abstract class.

The build engine may further include a manifest file including any number or type of topic ID strings and may repeat a specified cycle for any number of topics in the manifest file.

In addition, components may be divided into groups based on type. In one example, three types of components may be used. For example, one group of components may include action components for modifying a document. Another group of components may include flow control components for executing sub-steps any number of times in any number of different circumstances. Another group of components may include diagnostic components for checking the build system and determining if the build system is operating at various arbitrary intermediate points.

The action components may include any number or type of components for modifying the document. For example, action components may include a component for copying data from a file. In this example, the component may copy a node that is specified by a configurable source XPath expression from a configurable file. The component may further copy the node to a node in the document that is specified by a configurable target XPath expression.

In another example, the action components may include a component for copying data from an index. The component in this example may, for example, maintain an index of source nodes available in a document store. Thus, information may be copied from any document as needed while the information need not be stored in memory throughout the process. In addition, the component in this example may implement a caching mechanism. In this way, performance can be enhanced.

In another example, the action components may include a component for implementing logic specific to certain scenarios. For example, a component may resolve links to external API reference topics and may further generate link text appropriate to a referenced API.

In another example, the action components may include a component for transforming data. For example, the component in this example may apply a configurable transform (e.g., an XSL transform) and/or associated configurable arguments.

Also, the action components may include a component for saving a document. The component in this example may further save configurable subsections of the document to a path constructed via a configurable expression (e.g., configurable XPath expression).

The components may further include flow control components such as, for example, a component for executing a configurable set of sub-components depending on a result of a configurable XPath expression (e.g., an "IfThen" component) or a component for executing a configurable set of sub-components once for each node returned by a configurable XPath expression (e.g., a "ForEach" component).

Also, the components may further include any number or type of diagnostic components. Some non-limiting examples of diagnostic components include a component for writing a document or any configurable subsections thereof, to a log or other storage (e.g., a print component) or a component for ensuring that a document conforms to a schema specified by a configurable file (e.g., a validation component). For example, the component may be used to ensure that only strictly compliant XHTML documentation is generated.

Figure 6:
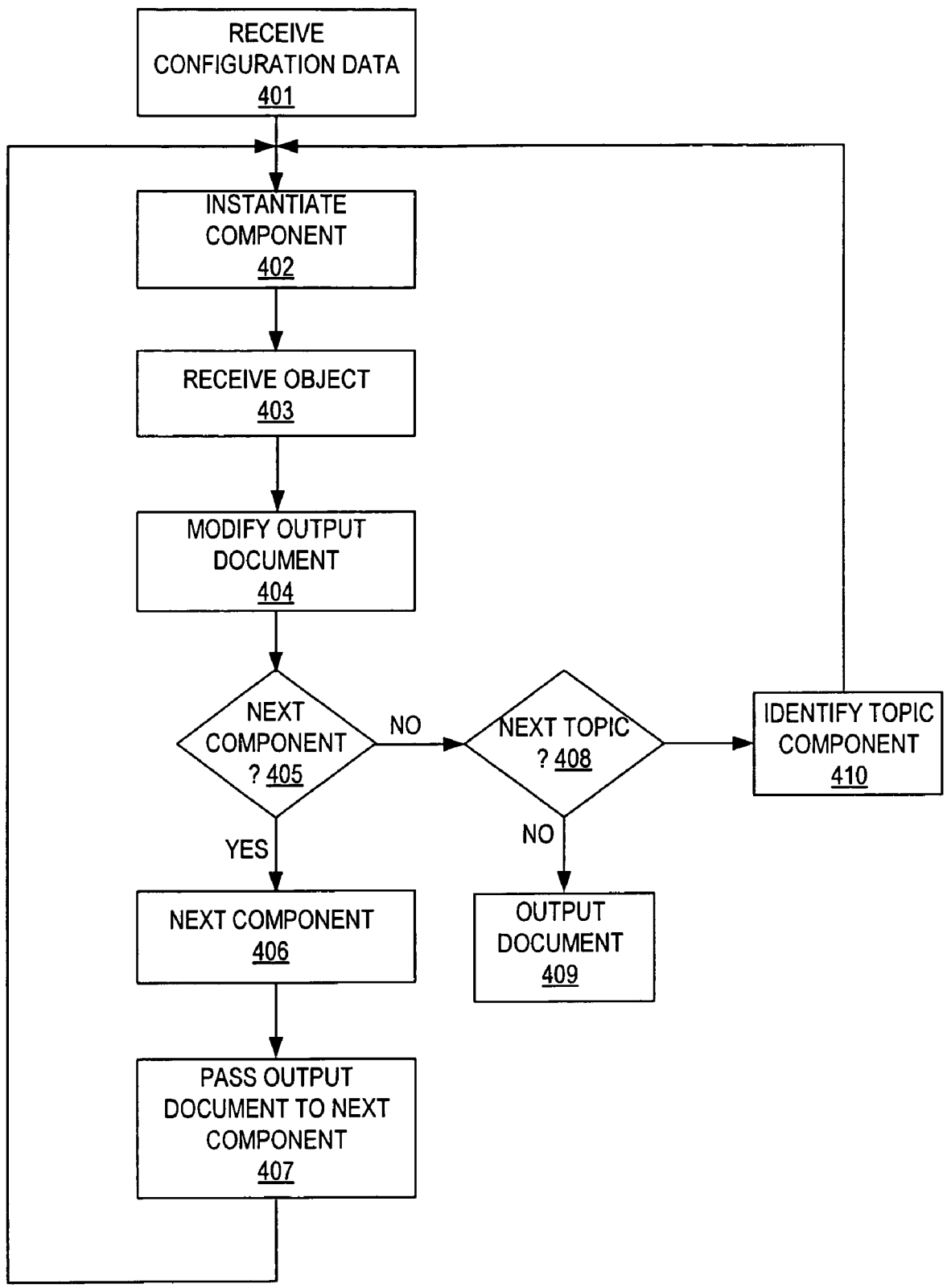
FIG. 6 is a flowchart illustrating an example of a process for a document build.

FIG. 6 is a flowchart illustrating an example of a process for a document build. In this example, configuration data may be received (STEP 401), the configuration data containing any information for an output document. The information may include, for example, an indication for components in execution of steps in the building of the output document. The components may be add-in components that may be added to a build engine in a sequence as specified by the configuration data in STEP 401. In addition, the information may indicate a function or activity for any of the components. The information in the configuration data may further be modified or altered such that the components in the document build may be modified or altered accordingly.

In STEP 402, a component may be instantiated. In this case, the component instantiated may be based on information in the configuration data. For example, the configuration may identify a particular add-in component to be included in a build engine for performing a desired function or activity. In STEP 403, an object corresponding to the identified add-in component may be received at the build engine from the add-in component. In one example, the object received from the add-in component may include an editable document (e.g., an XML document) and additional information (e.g., a data string) to inform the topic being built.

In STEP 404, a method of a component may be executed to manipulate or modify the document. The execution may be based on the configuration data. For example, the configuration data may contain a specification of functions or activities to be performed on the document, the components for performing the functions, and/or the order or sequence of the components or execution of functions/activities by the components. Hence, based on the configuration data, the output document may be modified (e.g., by a component).

If additional components are desired ("Yes" branch of STEP 405), the next component or add-in component may be included in the build engine. In this example, the configuration data may contain an indication of a next component to perform a desired function or activity on the document (STEP 406). As an example to illustrate, a second component may be indicated by the configuration data to perform a transform function on the document. In this case, the first component may pass the document to the second component (STEP 407), which may be instantiated in the build engine (STEP 402) and may pass an associated object (STEP 403) to further modify the document (STEP 404).

If a next component is not desired such that further modifications to the present topic of the document are not desired ("No" branch of STEP 405), then a determination of a next topic is made (STEP 408). For example, a manifest including a flat file of topic ID strings may be included. If a next topic ID string is identified ("Yes" branch of STEP 408 and STEP 410), then a component for the next topic may be identified based on the configuration data. The component may be instantiated (STEP 402) and the output document may be modified.

As described above, the process may be repeated such that components associated with the next topic may be instantiated to modify or manipulate the document. In one embodiment, components are instantiated once per run of the build engine. The build engine may process multiple documents in a single run. Thus, a component that has been previously instantiated that is called again by the configuration data is not re-instantiated.

The components may execute functions or actions based on configuration data from the configuration file and may also execute in a sequence based on data in the configuration file. When the final topic is complete ("No" branch of STEP 408), the output document may be output (STEP 409). Alternatively or additionally, the output document may be saved in memory.

It is understood that aspects of the present description can take many forms and embodiments. The embodiments shown herein are intended to illustrate rather than to limit the description, it being appreciated that variations may be made without departing from the spirit of the scope of the invention. Although illustrative embodiments have been shown and described, a wide range of modification, change and substitution is intended in the foregoing disclosure and in some instances some features may be employed without a corresponding use of the other features. Accordingly, it is appropriate that the examples be construed broadly and in a manner consistent with the scope of the invention.

What is claimed is:

1. A method of creating a document, the method comprising:
    receiving a configuration file that specifies a plurality of components and that specifies an order of operations and that comprises configuration data, wherein each of the plurality of components is distinct from each other of the plurality of components;
    loading a first component of the plurality of components, the first component configured to modify the document based on the configuration data of the configuration file;
    executing the first component according to the order of operations specified in the configuration file and according to the configuration data;
    modifying the document according to the executed first component and according to the configuration data of the configuration file;
    loading a second component of the plurality of components, the second component configured to modify the modified document based on at least a portion of the configuration data of the configuration file;
    passing the modified document to the second component according to the configuration file;
    executing the second component according to the order of operations specified in the configuration file and according to the configuration data;
    further modifying the modified document according to the executed second component and according to at least the portion of the configuration data of the configuration file;
    generating an output document from the further modified document; and
    outputting the output document, the method performed by a computing device.

2. The method of claim 1 wherein execution of the first component includes performing a first action on the document based on the configuration data.

3. The method of claim 2 further comprising modifying the configuration data, wherein the first component performs a second action on the document based on the modified configuration data.

4. The method of claim 1 further comprising receiving an object from the first component, the object including an editable document and a string indicating a topic being built.

5. The method of claim 4 further comprising executing the first component or the second component for each topic corresponding to a topic ID string in a manifest file.

6. The method of claim 1 wherein the first component or the second component includes one or more of an action component, a flow control component, or a diagnostic component.

7. The method of claim 6 wherein the action component includes one or more of a copy from file, a copy from index, a transform, or a save component.

8. The method of claim 6 wherein the flow control component includes one or more of an IfThen component for executing a configurable set of sub-components depending on a result of an expression or a ForEach component for executing a set of sub-components once for each node returned by an expression.

9. The method of claim 6 wherein the diagnostic component includes one or more of a print or a validation component.

10. One or more computer readable storage media including computer readable instructions that, when executed by a computing device, cause the computing device to perform operations comprising:
    receiving a configuration file that specifies a plurality of components and that specifies an order of operations and that comprises configuration data, wherein each of the plurality of components is distinct from each other of the plurality of components;

loading a first component of the plurality of components, the first component configured to modify the document based on the configuration data of the configuration file;

executing the first component according to the order of operations specified in the configuration file and according to the configuration data;

modifying the document according to the executed first component and according to the configuration data of the configuration file;

loading a second component of the plurality of components, the second component configured to modify the modified document based on at least a portion of the configuration data of the configuration file;

passing the modified document to the second component according to the configuration file;

executing the second component according to the order of operations specified in the configuration file and according to the configuration data;

further modifying the modified document according to the executed second component and according to at least the portion of the configuration data of the configuration file;

generating an output document from the further modified document; and outputting the output document, the method performed by a computing device.

11. A system creating a document, the system comprising:

a processor;

an analyzer implemented at least in part by the processor and configured for receiving a configuration file that specifies a plurality of components and that specifies an order of operations and that comprises configuration data, wherein each of the plurality of components is distinct from each other of the plurality of components;

a component constructor implemented at least in part by the processor and configured for loading a first component of the plurality of components, the first component configured to modify the document based on the configuration data of the configuration file;

the component constructor further configured for executing the first component according to the order of operations specified in the configuration file and according to the configuration data;

the component constructor further configured for modifying the document according to the executed first component and according to the configuration data of the configuration file;

the component constructor further configured for loading a second component of the plurality of components, the second component configured to modify the modified document based on at least a portion of the configuration data of the configuration file;

the component constructor further configured for passing the modified document to the second component according to the configuration file;

the component constructor further configured for executing the second component according to the order of operations specified in the configuration file and according to the configuration data;

the component constructor further configured for further modifying the modified document according to the executed second component and according to at least the portion of the configuration data of the configuration file;

a file generator implemented at least in part by the processor and configured for generating an output document from the further modified document; and an output implemented at least in part by the processor and configured for outputting the output document.

12. The system of claim 11 wherein the executing the loaded first component includes performing a first action on the document based on the configuration data.

13. The system of claim 12 further comprising a configuration module implemented at least in part by the processor and configured for modifying the configuration data, wherein the first component performs a second action on the document based on the modified configuration data.

14. The system of claim 11 further comprising the component constructor further configured for receiving an object from the first component, the object including an editable document and a string indicating a topic being built.

15. The method of claim 14 further comprising the component constructor further configured for executing the first component or the second component for each topic corresponding to a topic ID string in a manifest file.

16. The method of claim 11 wherein the first component or the second component includes one or more of an action component, a flow control component or a diagnostic component.

17. The method of claim 16 wherein the action component includes one or more of a copy from file, a copy from index, a transform, or a save component.

18. The method of claim 16 wherein the flow control component includes one or more of an IfThen component for executing a configurable set of sub-components depending on a result of an expression or a ForEach component for executing a set of sub-components once for each node returned by an expression.

19. The method of claim 16 wherein the diagnostic component includes one or more of a print or a validation component.

* * * * *